(12) United States Patent
Ma et al.

(10) Patent No.: US 8,082,263 B2
(45) Date of Patent: Dec. 20, 2011

(54) METHOD, APPARATUS AND SYSTEM FOR MULTIMEDIA MODEL RETRIEVAL

(75) Inventors: Yanping Ma, Shenzhen (CN); Qinwei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 658 days.

(21) Appl. No.: 12/205,792

(22) Filed: Sep. 5, 2008

(65) Prior Publication Data

US 2009/0070329 A1 Mar. 12, 2009

(30) Foreign Application Priority Data

Sep. 6, 2007 (CN) .......................... 2007 1 0076944

(51) Int. Cl.
G06F 7/00 (2006.01)
G06F 17/30 (2006.01)

(52) U.S. Cl. ...................... 707/758; 707/769; 707/780

(58) Field of Classification Search ........................ None
See application file for complete search history.

(56) References Cited

U.S. PATENT DOCUMENTS

| | | | |
|---|---|---|---|
| 6,192,360 B1 | 2/2001 | Dumais et al. | |
| 6,466,687 B1* | 10/2002 | Uppaluri et al. | 382/128 |
| 7,339,992 B2* | 3/2008 | Chang et al. | 375/240.25 |
| 7,711,157 B2* | 5/2010 | Duong et al. | 382/118 |
| 2005/0163278 A1* | 7/2005 | Metz et al. | 378/4 |
| 2006/0210131 A1* | 9/2006 | Wheeler et al. | 382/128 |
| 2007/0052700 A1* | 3/2007 | Wheeler et al. | 345/419 |
| 2008/0025592 A1* | 1/2008 | Jerebko et al. | 382/132 |
| 2008/0123940 A1* | 5/2008 | Kundu et al. | 382/159 |
| 2008/0194946 A1* | 8/2008 | Summers et al. | 600/425 |
| 2010/0021014 A1* | 1/2010 | Bebis | 382/115 |
| 2010/0104154 A1* | 4/2010 | Chan et al. | 382/128 |

FOREIGN PATENT DOCUMENTS

| | | |
|---|---|---|
| CN | 1310825 A | 8/2001 |
| CN | 1710557 A | 12/2005 |
| CN | 101004748 A | 7/2007 |

OTHER PUBLICATIONS

J. Yu and Q. Tian. Learning image manifolds by semantic subspace projection. In Proceedings of the ACM Conference on Multimedia, Santa Barbara, Oct. 2006.*

P. Bouthemy, C. Garcia, R. Ronfard, G. Tziritas, E. Veneau, D. Zugaj, Scene segmentation and image feature extraction for video indexing and retrieval, Third International Conference on Visual Information and Information Systems (VISUAL'99), Lecture Notes in Computer Science, vol. 1614, 1999, pp. 245-252.*

* cited by examiner

*Primary Examiner* — Jay Morrison

(57) ABSTRACT

A method, apparatus and system for multimedia model retrieval are provided. The method includes: obtaining parameters of a multimedia model to be retrieved; performing a projection on the multimedia model according to the parameters of the multimedia model so as to obtain a projection image; performing a feature extraction on the projection image; matching a feature extraction result with stored model multimedia file information to obtain a retrieval result; training a support vector machine (SVM) with the multimedia model labeled by a user upon the retrieval result as a training sample set, performing a probability-based classification on the multimedia model by the SVM, and updating the retrieval result with a classification result. The system of the present invention illustrated by embodiments achieves favorable applicability and robustness, so that users may perform a rapid and precise retrieval on massive model data in these fields.

16 Claims, 6 Drawing Sheets

(a) (b)

(c) (d)

METHOD, APPARATUS AND SYSTEM FOR MULTIMEDIA MODEL RETRIEVAL

CROSS-REFERENCE TO RELATED APPLICATION

This application claims priority to Chinese Patent Application No. 200710076944.7, filed Sep. 6, 2007, which is hereby incorporated by reference in its entirety.

FIELD OF THE INVENTION

The present invention relates to a multimedia retrieval technique, and more particular, to a method, apparatus and system for multimedia model retrieval.

BACKGROUND

With the development of multimedia technique and network technique, a multimedia model retrieval technique is also increasingly progressing and a multimedia model retrieval system has become a key point in the research of the industry. A so-called multimedia includes texts, graphics, audio, video, three-dimensional/multidimensional models or a combination thereof. Content-based multimedia retrieval is similarity retrieval based on multimedia information features.

A conventional multimedia model retrieval method includes the following steps: Parameters of multimedia model information are read, in which the multimedia models in different formats or properties are made consistent; features of the multimedia model are extracted, in which comparable contents, i.e., features, in multimedia information are extracted and quantized; similarity degrees between models are calculated, in which a similarity degree between a model to be retrieved and a database model is calculated according to the features of the models; each group of data in the database is classified by a machine learning method in a neural network based on manual labeling of a user so as to obtain a retrieval result.

In the study of the multimedia retrieval technique, the inventor finds that there are at least following disadvantages in the above conventional multimedia model retrieval method: A multimedia information retrieval feedback system implemented in the prior art needs to label manually a plenty of models in learning and classification steps. The number of labels depends on size of the database and precision of a feature extraction method. Sometimes, thousands of data or billions of data needs to be manually labeled, thus it severely affects feedback speed. Moreover, the above method has poor applicability and robustness.

SUMMARY

Therefore, it is in need to provide a method for multimedia model retrieval advantageous in having a low feedback frequency and favorable applicability and robustness.

Meanwhile, a apparatus and system for multimedia model retrieval also advantageous in having a low feedback frequency and favorable applicability and robustness are provided.

A method for multimedia model retrieval includes the following steps:

Parameters of a multimedia model to be retrieved are acquired.

A projection is performed on the multimedia model according to the parameters of the multimedia model so as to obtain a projection image.

A feature extraction is performed on the projection image.

A feature extraction result is matched with stored multimedia model file information so as to obtain a retrieval result.

A support vector machine is trained with the multimedia model labeled by a user upon the retrieval result as a training sample set, a probability-based classification is performed on the multimedia model by the support vector machine, and the retrieval result are updated with a classification result.

A apparatus for multimedia model retrieval includes a model file initializing module, a projection module, a feature extraction module, a similarity degree matching module and a feedback module.

The model file initializing module is adapted to acquire parameters of a multimedia model to be retrieved.

The projection module is adapted to perform a projection on the multimedia model according to the parameters of the multimedia model so as to obtain a projection image.

The feature extraction module is adapted to perform a feature extraction on the projection image.

The similarity degree matching module is adapted to match a feature extraction result with stored multimedia model file information so as to obtain a retrieval result.

The feedback module is adapted to train a support vector machine with the multimedia model labeled by a user upon the retrieval result as a training sample set, perform a probability-based classification on the multimedia model by the support vector machine, and update the retrieval result with a classification result.

A system for multimedia model retrieval includes a database management system and a model retrieval apparatus.

The database management system is adapted to store multimedia model file information.

The model retrieval apparatus is adapted to acquire parameters of a multimedia model to be retrieved, perform a projection on the multimedia model according to the parameters of the multimedia model so as to obtain a projection image, perform a feature extraction on the projection image, match a feature extraction result with the multimedia file information stored in the database management system to obtain retrieval result, train a support vector machine with the multimedia model labeled by the user upon the retrieval result as a training sample set, perform a probability-based classification on the multimedia model by the support vector machine and update the retrieval result with a classification result.

In the embodiments of the present invention, the support vector machine is trained with the multimedia models labeled by the user upon the retrieval result as a training sample set, the probability-based classification is performed on the multimedia model via the support vector machine and the retrieval result is updated by using the classification result. In this manner, when retrieving the multimedia model, the retrieval result with a higher precision is obtained with fewer model samples, the feedback frequency is reduced and favorable applicability and robustness are achieved. Therefore, the system for multimedia model retrieval may serve as a three-dimensional model retrieval system in fields such as biomolecule, machine manufacturing, terrain contour matching and game and animation designing to help the users perform a rapid and precise retrieval on massive model data in these fields.

DETAILED DESCRIPTION

Figure 1:
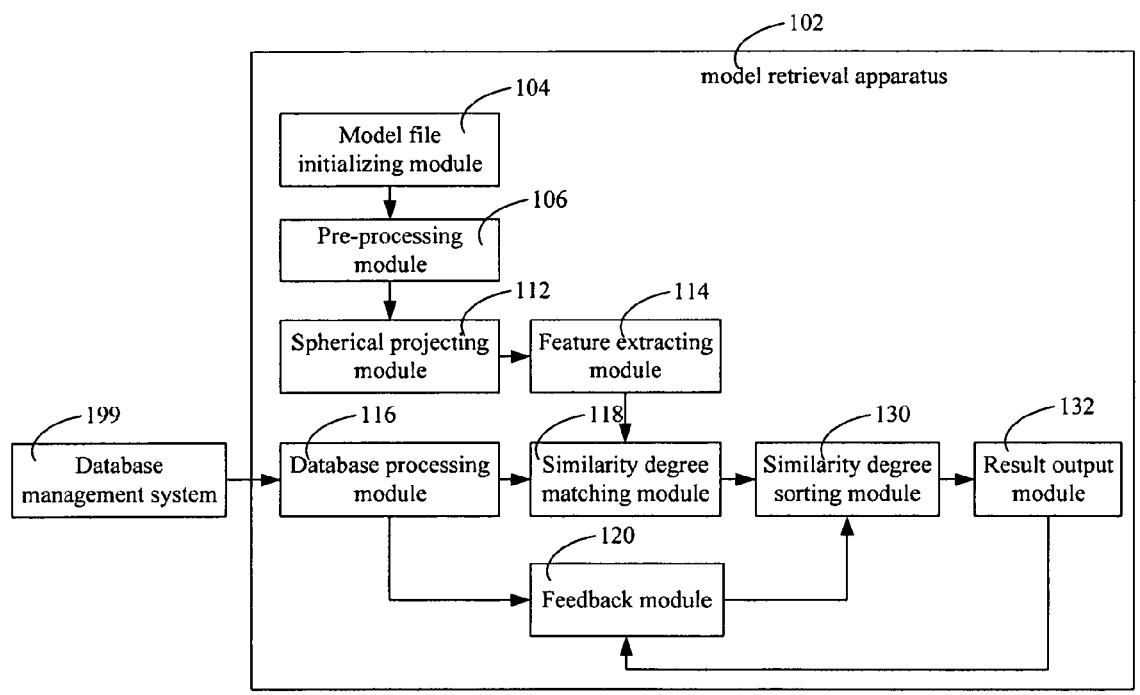
FIG. 1 is a schematic view illustrating the apparatus for multimedia model retrieval in accordance with an embodiment of the present invention.

Referring to FIG. 1, the embodiment of a apparatus for multimedia model retrieval includes the model retrieval apparatus 102 and the database management system 199. The database management system 199 is adapted to store the multimedia model file information. The model retrieval apparatus 102 is adapted to acquire the parameters of the multimedia model to be retrieved, perform the projection on the multimedia model according to the parameters of the multimedia model so as to obtain the projection image, perform the feature extraction on the projection image, match the feature extraction result with the multimedia file information stored in the database management system 199 to obtain the retrieval result, train the support vector machine (SVM) with the multimedia model labeled by the user upon the retrieval result as a training sample set, perform the probability-based classification on the multimedia model by the SVM and update the retrieval result by using the classification result. The multimedia file information stored in the database management system 199 may be the multimedia model file, also may be feature extraction parameters of the multimedia model, for example, the model with features extracted by the Zernike moment.

In this embodiment, the model retrieval apparatus 102 includes the model file initializing module 104, the pre-processing module 106, a spherical projecting module 112, a database processing module 116, the feature extracting module 118, the similarity degree sorting module 130, a result outputting module 132 and the feedback module 120.

The model file initializing module 104 is adapted to acquire the parameters of the multimedia model to be retrieved, for example, to receive a three-dimensional model file selected by the user acting as a matching source. The model file initializing module 104 is independent of the file format of the model and may receive the three-dimensional model files in various formats, such as .3ds files. The model file information including the model parameters is read. The model file information includes the number of the vertexes, coordinates of the vertexes, normal vectors and vertex indexes of the triangles. The file format of the model file information may be the file format of a storable text, such as .txt, and so on. The reading the model file information may include the following steps in this embodiment:

1) The model file is opened.

2) The first 9 bits of the file are read as a start code of the vertex parts and the procedure of processing the first 9 bits is skipped. 4 bytes are read and stored as an integer variable to serve as the number of the vertexes. Block 3) and Block 4) are repeatedly implemented according to the number of the vertexes.

3) Coordinates x, y, z of the vertexes are read.

4) The coordinates x, y, z of the normal vectors are read.

5) 11 bits are continued to be read as the start code of the triangles and the procedure is skipped. Four bytes are read and stored as the integer variable to serve as the number of the triangles. Block 6) and Block 7) are repeatedly implemented according to the number of the triangles.

6) Index values of the three vertexes of the current triangle are read. Coordinate values of the three vertexes are determined according to the index values.

7) Area of each triangle and the total area (m_myTotalArea) are calculated and saved according to the coordinate values of the three vertexes, and meanwhile minimum distance (m_fMinR) from all the vertexes to the origin is calculated and saved. If the model is a two-dimensional model in the above reading process, the coordinates x and y of the model are only read and no more description will be provided for a multidimensional model.

Figure 2:
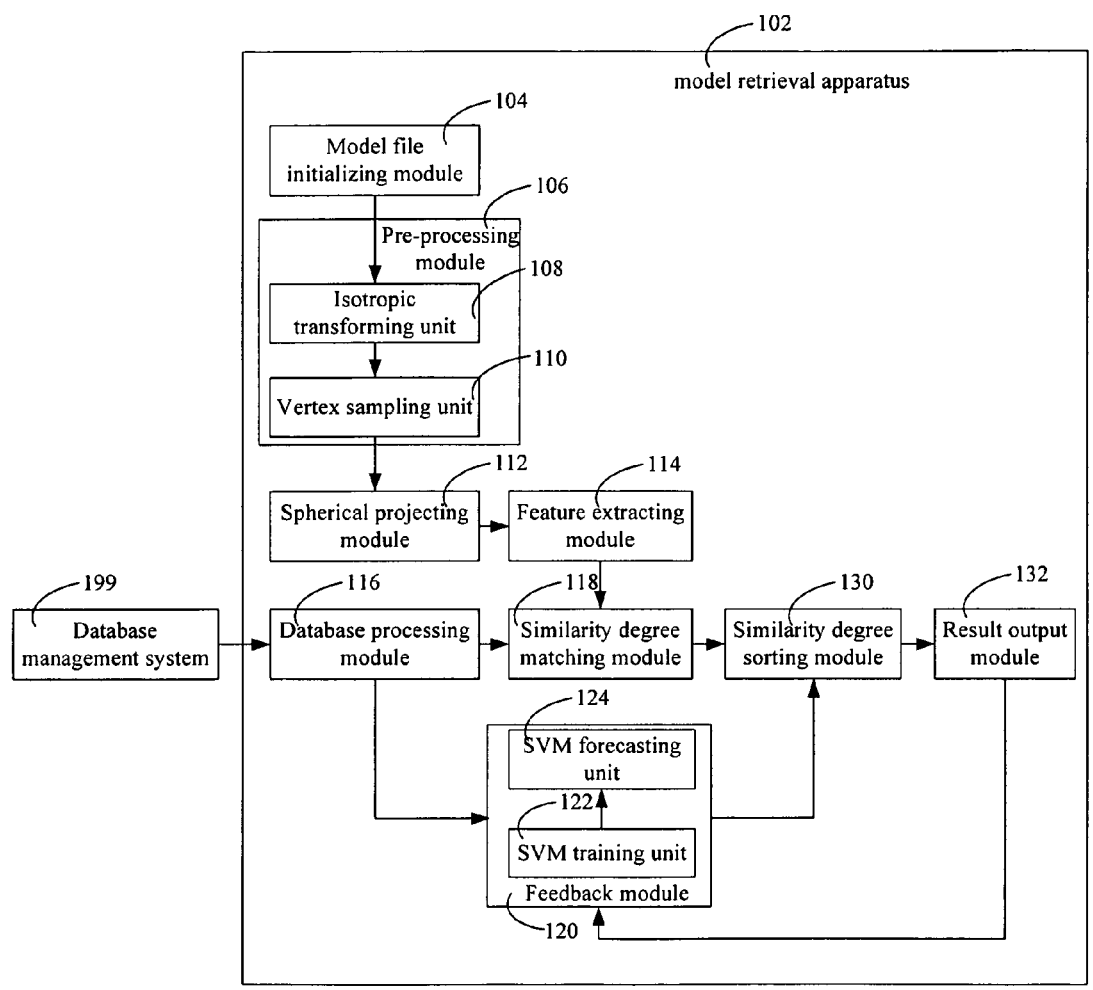
FIG. 2 is a schematic view illustrating the apparatus for multimedia model retrieval in accordance with another embodiment of the present invention.

The pre-processing module 106 is adapted to perform the pre-processing on the acquired parameters of the multimedia model to be retrieved. Referring to FIG. 2, the pre-processing module 106 in this embodiment includes the isotropic transforming unit 108 and the vertex sampling unit 110. The isotropic transforming unit 108 is adapted to perform the isotropic transformation on the acquired multimedia model.

Figure 3:
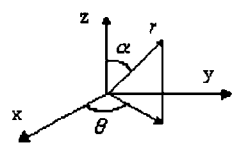
FIG. 3 is a relationship diagram between the Zernike moment and θ and α of a spherical coordinate system in accordance with the embodiment of the present invention.

Referring to FIG. 3, the three-dimensional Zernike moment of a spherical image is associated with θ and α of the spherical coordinate system, the three-dimensional coordinate systems provided by the users may be inconsistent and vertex distribution of the three-dimensional model may be non-uniform or vertex density is too low. Therefore, in this embodiment, the isotropic transformation is performed on the three-dimensional model by using the isotropic transformation unit 108 and the vertex sampling is performed by using the vertex sampling unit 110 to unify the coordinates of the three-dimensional model. Model structure variables are output after the isotropic transformation is performed on the variables. Area weighting coefficients are added to an isotropic transformation matrix and the formula is as follows:

$$\begin{cases} C_P = \left[ \sum_{i,j=1}^{N} (s_i p_i - s_j p_j)(s_i p_i - s_j p_j)^t \right]^{-\frac{1}{2}} \\ Q = C_P P \end{cases} \quad (1)$$

$P=\{p_1, \ldots p_n\}$ is a vertex sequence before the transformation, $Q=\{q_1, \ldots q_n\}$ is the vertex sequence after the transformation and $s_i$ is the total area of all triangles adjacent to the vertex $p_i$. An improved transformation matrix $C_p$ is still isotropic, the area weighting is added in a vertex calculation to reduce the deviation caused by non-uniform vertex distribution. The isotropic transformation matrix is called as an area weighting isotropic transformation matrix. The matrix is adapted to perform the transformation on every vertex of the model structure variables and the feature values of the matrix are calculated and stored for later operation.

Figure 4:
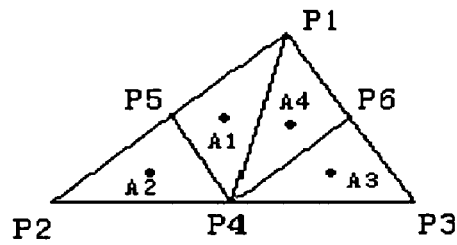
FIG. 4 is a schematic view illustrating a subdivision of a triangle in accordance with the embodiment of the present invention.

The vertex sampling unit 110 is adapted to perform the vertex sampling on the multimedia model after the isotropic transformation. In this embodiment, the vertex sampling unit 110 subdivides, i.e., samples, the triangles with a large area. Referring to FIG. 4, a triangle (P1, P2, P3) is taken as an example in this embodiment. P1, P2, and P3 are respectively three vertexes of the triangle. Then, the triangle (P1, P2, P3) is subdivided in the following manner: a longest side (P2, P3) is determined and P4 is a midpoint of the side (P2, P3); P1 and P4 are connected to subdivide the triangle (P1, P2, P3) into two triangles, i.e., a triangle (P1, P2, P4) and a triangle (P1, P4, P3); the areas of the triangles are calculated by Helen's formula. An area calculation of the triangles is a prior art and will not be repeated herein again. If the area of the triangle (P1, P2, P4) or the triangle (P1, P4, P3) is larger than a preset threshold F, the triangle with the area larger than the threshold F needs to be further subdivided by the aforementioned method. The rest can be deduced by analogy till the area of each triangle after subdivision is smaller than the threshold F. An incenter of each triangle after subdivision serves as a new sampling point of the three-dimensional model. Referring to FIG. 4, A1, A2, A3 and A4 are respectively new sampling points of the divided three-dimensional model. The aforementioned threshold F is preset as m_myTotalArea/100000 in this embodiment. For the two-dimensional model, the subdivision of the triangle may be implemented by merely dividing a curved edge of the two-dimensional model by line segments. The principle is identical to that of the three-dimensional model. In addition, the multidimensional model also adopts the same subdivision principle and the details will not be repeated herein again.

The spherical projecting module 112 is adapted to perform the spherical projection on the multimedia model according to the parameters of the multimedia model to obtain the spherical projection image. In this embodiment, the above three-dimensional model may be normalized to fit inside a unit sphere called as a unit bounding sphere. A sphere center is marked as $P_c$. Suppose the $P(r_1, r_2)$ is a collection of the vertexes of the three-dimensional model, $P(r_1, r_2)$ may be expressed as:

$$P(r_1, r_2) = \{P | r_1 < L(P, P_c) \leq r_2, r_1 < r_2\} \quad (2)$$

Figure 5:
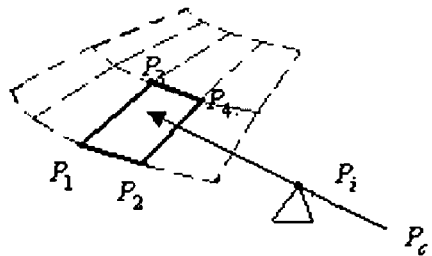
FIG. 5 is a schematic view illustrating the projection of the vertexes of the three-dimensional model in accordance with the embodiment of the present invention.

$r_1$ and $r_2$ respectively represent a shortest distance and a longest distance from the sphere center $P_c$ and $L(P, P_c)$ represents the distance from a model vertex P to the sphere center $P_c$. The radius is marked as $r_2$ and the spherical surface is marked as $S_{r_2}$. The spherical surface is uniformly partitioned by longitude and latitude lines and initial longitude latitude weight values of all grids are 0. Each vertex in the vertex collection $P(r_1, r_2)$ of the three-dimensional model is mapped to $S_{r_2}$. Referring to FIG. 5, the vertex $P_i$ is mapped to the spherical surface in the following manner. $P_c$ and $P_i$ are connected, and $P_c P_i$ is elongated to intersect with $S_{r_2}$. Suppose the intersection point is in the grid $(P_1, P_2, P_3, P_4)$ of $S_{r_2}$, longitude latitude weight values of the grid $(P_1, P_2, P_3, P_4)$ are added by 1. After all the vertexes in $P(r_1, r_2)$ are mapped to $S_{r_2}$, the spherical projection of $P(r_1, r_2)$ is obtained and marked as $PRO(r_1, r_2)$. In this embodiment, r1=m_fMinR−0.1 and r2=1.0001, so as to prevent any vertex from intersecting with the two spherical surfaces. For the two-dimensional model, the above spherical projection may be similarly projected onto a unit circle and the principle is identical to that of the three-dimensional model. In addition, the multidimensional model also adopts the same projection principle and the details will not be repeated herein again.

The feature extraction module 114 is adapted to perform the feature extraction on the projection image. In this embodiment, the feature extraction is implemented by the Zernike moment as the example for illustration. The spherical projection image output by the spherical projection module 112 is served as an input structure variable to output three-dimensional Zernike moment coefficient structure variables. The feature extraction module 114 calculates a Zernike moment coefficient of the three-dimensional model, for example, a calculation formula based on a Cartesian coordinate system is as follows:

$$x = |x| \vec{\xi} = r\vec{\xi} = r(\sin \alpha \sin \theta, \sin \alpha \cos \theta, \cos \theta)^T \quad (3)$$

The three-dimensional Zernike moment is calculated by the following formula. In the formula, f(x) is a function for converting an obtained spherical projection function to the Cartesian coordinate system and n is a bandwidth and preferably 16 upon tests; m is a frequency component under each band; and l is satisfied with $0 \leq l \leq n$ and to make n−l an odd number.

$$\Omega_{nl}^m = \frac{3}{4\pi} \int_{|x| \leq 1} f(x) \overline{Z_{nl}^m(x)} dx \quad (4)$$

$$Z_{nl}^m(x) = R_{nl}(r) \cdot Y_l^m(\alpha, \theta) \quad (5)$$

In the formula (5), $R_{nl}(r)$ is a polynomial taking the radius of the spherical coordinate system as the parameter and $Y_l^m$ is a spherical surface harmonic operator. In actual calculation, each value in $r \in (0, 1]$ is taken to obtain $Z_{nl}^m$ through integration. The formula (6) is a computation expression of the spherical surface harmonic operator, wherein $N_l^m$ is a scale factor in the formula (7) and $P_l^m$ is a Legendre polynomial.

$$Y_l^m(\alpha, \theta) = N_l^m P_l^m(\cos \alpha) e^{im\theta} \quad (6)$$

$$N_l^m = \sqrt{\frac{2l+1}{4\pi} \frac{(l-m)!}{(l+m)!}} \quad (7)$$

A second-order norm of the three-dimensional Zernike moment is calculated and stored for later operation. The calculation formula is as follows:

$$F_{nl} = \|\Omega_{nl}\| = \left( \sum_{i=-l}^{l} (\Omega_{nl}^i)^2 \right)^{1/2} \quad (8)$$

The database processing module 116 is adapted to provide the multimedia model file information stored in the database management system 199. In this embodiment, the model database file may be a pre-processed .txt file generated in the same way as the aforementioned pre-processing or by other pre-processing methods. In this embodiment, the processing may be: inputting opened database file variables and outputting structure link lists of every model information in the database. The data is read and stored in a link list to be called in subsequent processes. The three-dimensional model database file includes the number of the model files, file names, the three-dimensional Zernike moment coefficient, isotropic transformation matrix coefficients and so on. The details of the step is as follows:

1) The database file is opened.

2) The number of the model files stored in the database is read. The method is to read the first 4 bytes of each file and store the first four bytes of each file as the integer variable. The following steps are repeatedly implemented according to the number of the model files.

3) Link list nodes are initialized which we call a DataLink. The structure of the DataLink includes the following data: one Cstring variable for saving model file names, one float array with the size of 289 for saving the three-dimensional Zernike moment coefficient, one float array with the size of 9 for saving the isotropic transformation matrix coefficients, three float variables for saving three feature values of the isotropic transformation matrix and one DataLink* pointer for pointing to subsequent nodes.

4) The length of a model file name is read. The method is to read the first 4 bytes of the file name and save the first 4 bytes as the integer variable. Thereby, the file name is read according to the number of bytes indicated by the length.

5) The Zernike moment coefficient is read. The Zernike moment coefficient is one float array with the size of 289.

6) 9 (3*3) isotropic transformation matrix coefficients are read and three feature values of the isotropic matrix are calculated.

The similarity degree sorting module 118 is adapted to match the feature extraction result with the stored nodel multimedia file information to obtain the retrieval result. In this embodiment, the three-dimensional model matching includes calculating an offset distance of the three-dimensional Zernike moment coefficient, calculating similarity degrees of the models, sorting the similarity degrees and outputting the result. The offset distance of the three-dimensional Zernike moment is calculated by the formula (9), wherein $\Omega_{nl1}{}^i$ is the three-dimensional Zernike moment coefficient of the model selected by the user and $\Omega_{nl2}{}^i$ is a three-dimensional Zernike moment of a certain model in the database.

$$diff = \sum_{i=-l}^{l} |\Omega_{nl1}^i - \Omega_{nl2}^i| \quad (9)$$

The similarity degrees of the models are calculated. The similarity degree of the models reflects how the two three-dimensional models are alike. The smaller the similarity degree is, the worse the similarity of the three-dimensional models is. On the contrary, the larger the similarity degree is, the better the similarity of the three-dimensional models is. The isotropic transformation employed in the pre-processing should be considered. The calculation formulas are shown as formulas (10) and (11), wherein $ev_{1i}$ is the feature value of the isotropic transformation matrix of the model selected by the user and $ev_{2i}$ is the feature value of the isotropic transformation matrix of the certain model in the database.

$$evdiff = \sum_{i=1}^{3} |ev_{1i} - ev_{2i}| \quad (10)$$

$$sim = 1 - diff * evdiff \quad (11)$$

The similarity degree sorting module 130 is adapted to sort the retrieval result obtained by matching or the updated retrieval result. In this embodiment, the obtained similarity degrees of the models are sorted in descending order. The sort algorithm is at least one selected from bubble sort, hash sort, quick sort, merge sort and heap sort. The model file names are sequentially stored in a text file after being sorted.

The result output module 132 is adapted to output the sorted result. In this embodiment, several sorted results are selected and output sequentially. The specific method is: Corresponding files in the database are found according to the file names, and information of the vertexes and grids are read and depicted on a program interface. The number of the output models should satisfy the demand of the next feedback and is preferably 40 to 60. Of course, each page may also display 20 models with the first one fixedly displaying the model selected by the user and the rest 19 models displaying the results. Altogether 3 pages display 58 models in total.

The feedback module 120 is adapted to train the SVM with the multimedia model labeled by the user upon the retrieval result as a training sample set, perform the probability-based classification on the multimedia model by the SVM and update the retrieval result with the classification result. The feedback module 120 includes the SVM training unit 122 and the SVM forecasting unit 124. The SVM training unit 122 is adapted to employ the user manual labeled models as the training sample and train the SVM with the training sample. The SVM forecasting unit 124 is adapted to forecast models in the database by the SVM. In this embodiment, it is up to the user to determine whether the retrieval result is satisfactory, and if the user is not satisfied with the retrieval result, the user needs to manually label relevant/irrelevant. If the model in the result and the input model are relevant, the probability value is set to be 1; if the model in the result and the input model are irrelevant, the probability value is set to be −1. The probability values of the models and the second-order norms of the three-dimensional Zernike moment are written into one text file. The saved data (referred to as vectors) is used to train one SVM. A proper non-linear map $\phi:x \rightarrow \phi(x)$ is employed to map original data into a high-dimensional feature space to make a linear classification method applicable to the high-dimensional feature space. The calculation formula is as follows:

$$\min_{w,b,\xi} \frac{1}{2} w^T w + C \sum_{i=1}^{l} \xi_i \text{ satifying } y_i(w^T \phi(x_i) + b) \geq 1 - \xi_i, \quad (12)$$

$$\xi_i \geq 0, i = 1 \ldots l$$

C is a penalty factor and $\phi(x_i)$ is the aforementioned non-linear map. An equivalent form of the formula (12) used in actual calculation is shown as follows:

$$\min_{\alpha} \frac{1}{2} \alpha^T Q \alpha - e^T \alpha \text{ satisfying } y^T \alpha = 0, 0 \leq \alpha_i \leq C, i = 1 \ldots l \quad (13)$$

The vector e represents each training data; $Q_{ij} \equiv y_i y_j K(x_i, x_j)$ is a positive semi-definite matrix; and $K(x_i, x_j) \equiv \phi(x_i)^T \phi(x_j)$ is a kernel function and may be one of the following functions:

Linear function: $K(x_i, x_j) = x_i^T x_j$ (14)

Polynomial function: $K(x_i, x_j) = (\gamma x_i^T x_j + r)^d, \gamma > 0$ (15)

Radial basic function (RBF): $K(x_i, x_j) = \exp(-\gamma \|x_i - x_j\|^2)$, $\gamma > 0$ (16)

Sigmoid function: $K(x_i, x_j) = \tan h(\gamma x_i^T x_j + r)$ (17)

In one embodiment, RBF is selected and $\gamma = 10^{-3}$.

Generally, when the SVM trains a support vector, a classification determining function of each data is set as follows:

$$f(x) = \sum_{i=1}^{l} y_i \alpha_i K(x_i, x) + b \quad (18)$$

α is calculated in the following steps:

1) The kernel function (16) is substituted in the formula (13) combined with a constraint condition to construct a Lagrange function to obtain a group of α vectors when a target formula is established.

2) The α vectors are substituted in the formula (19) or (20) to obtain the value of b.

3) The α vectors and the value b are substituted in the formula (18) to obtain an expression of the determining function.

4) The formula (18) is substituted in the formula (22) to obtain the expression of the probability value of the support vector. To calculate the values of A and B in the expression, the formulas (24) and (25) are substituted in the formula (23). A minimum value of the formula (23) is obtained by an iterative method and the values of A and B at this time are desired. The values are substituted back to the formula (24) (i.e., 21) to obtain the probability value of each support vector.

5) The probability values of the support vectors are employed to calculate the probability values of sample points, i.e., the values of A, B and the formula (18) are substituted in the formula (26) for calculation.

6) The above values are calculated to obtain the formulas (28) and (29).

b is calculated by the following method: If there is $0 < \alpha_i < C$, $$b = -\frac{\sum_{0<\alpha_i<C} y_i \nabla f(\alpha)_i}{\sum_{0<\alpha_i<C} 1} \quad (19)$$

if there is not $0 < \alpha_i < C$, $$M(\alpha) = \max\{y_i \nabla f(\alpha)_i \mid \alpha_i = 0, y_i = -1 \text{ or } \alpha_i = C, y_i = 1\} \quad (20)$$

$$m(\alpha) = \min\{y_i \nabla f(\alpha)_i \mid \alpha_i = 0, y_i = 1 \text{ or } \alpha_i = C, y_i = -1\}$$

$$b = \frac{M(\alpha) + m(\alpha)}{2}$$

Generally, a sign function is employed for classification i.e., the classification is performed according as the value of the formula (21) is 1/−1:

$$\text{sgn}(f(x)) \quad (21)$$

In this embodiment, a posterior probability p(y=1|x) of classifying some data to 1 is calculated, i.e., the probability which one model is considered belonging to a similar class. The calculation formula is shown as follows, wherein f(x) is the aforementioned determining function.

$$p(x) = \frac{1}{1 + \exp(Af(x) + B)} \quad (22)$$

To estimate an optimum parameter value of (A, B), the present invention employs l training samples to calculate the following formula (in one embodiment, l=58):

$$\min_{z=(A,B)} F(z) \text{ where } F(z) = -\sum_{i=1}^{l} (t_i \log(p_i) + (1-t_i)\log(1-p_i)), \quad (23)$$

$$p_i = \frac{1}{1 + \exp(Af_i + B)}, \quad (24)$$

$$t_i = \begin{cases} \frac{N_+ + 1}{N_+ + 2} & \text{if } y_i = 1 \\ \frac{1}{N_- + 2} & \text{if } y_i = -1 \end{cases} \quad i = 1 \ldots l \quad (25)$$

$N_+$ is the number of samples with $y_i=1$ and $N_-$ is the number of samples with $y_i=-1$.

The optimum value of (A, B) obtained is substituted in the formula (24) to calculate the probability value of each support vector and save the probability value for later operation.

The support vectors obtained by the above training are used to forecast the posterior probability of each model in the database. The formula (18) is employed to calculate the determining function of each data. The probabilities considered relevant are obtained as:

$$pp_i = \min\{\max\{sp(f_i, A, B), \sigma\}, 1-\sigma\} \quad (26)$$

wherein, $$sp(f_i, A, B) = \begin{cases} \frac{\exp(-fApB)}{1 + \exp(-fApB)} & fApB \geq 0 \\ \frac{1}{1 + \exp(fApB)} & fApB < 0 \end{cases} \quad (27)$$

$$fApB = A * f_i + B$$

σ is a preset minimum probability value and $\sigma = 10^{-7}$ is indicated in a preferred embodiment.

The forecast probability of each model in the database is obtained and saved for later operation.

The similarity degrees are updated and sorted. The updating formula is as follows:

$$pp\text{sum}_{new} = \epsilon * pp\text{sum}_{old} + pp, \ 0 \leq \epsilon \leq 1 \quad (28)$$

$$\text{sim}_{new} = \text{sim}_{old} + pp\text{sum}_{new} \quad (29)$$

The coefficient ε controls a proportion of the probability values forecasted in the previous several rounds in a total corrected value. If the coefficient ε is 0, it represents that only the current forecast value has effects on the corrected value, and if the coefficient ε is 1, all the previous forecast values share the same importance in the corrected value. This coefficient is set as 0.5 in one embodiment.

The current result is displayed to the user. If necessary, multiple rounds of feedback are performed. In the embodiment of the present invention, the latest round of the manual label of the user is employed to train the SVM in each round of feedback, the probability is used in the training and forecasting processes and each correction to the similarity degree value is remained. The practice proves that the model retrieval system is effective in the multimedia information retrieval and feedback field. The model retrieval system is applicable to the two-dimensional model or the multidimensional model and the details will not be illustrated herein again.

Figure 6:
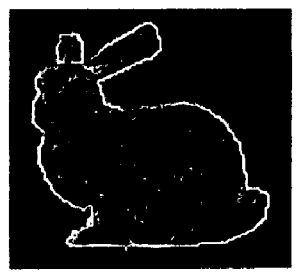
FIG. 6 is a schematic view illustrating a bunny model as a retrieval example in accordance with the embodiment of the present invention.
Figure 6:
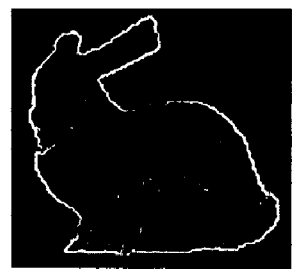

The aforementioned model retrieval system trains the SVM with the multimedia model labeled by the user upon the retrieval result as a training sample set, performs the probability-based classification on the multimedia model by the SVM and updates the retrieval result with the classification result. In this manner, when retrieving the multimedia model, the retrieval result with higher retrieval precision is obtained with fewer model samples, the feedback frequency is reduced and favorable applicability and robustness are achieved. Therefore, the system for multimedia model retrieval may serve as the three-dimensional model retrieval system in fields such as the biomolecule, the machine manufacturing, the terrain contour matching and the game and animation designing, so that the users may perform the rapid and precise retrieval on the massive model data in these fields. The spherical projection image and the three-dimensional Zernike moment are employed to measure the features of the three-dimensional model. Robustness tests of noises, rotation and grid simplification are performed on this embodiment. The test processes are respectively illustrated as follows:

The grid simplification is performed on the three-dimensional model and the number of the vertexes of the simplified three-dimensional model is 20% to 50% of the original number. A retrieval experiment analyse is performed. FIG. 6 shows the simplification result of the bunny model. There are 554 vertexes in FIG. 6 (a) and 255 vertexes in FIG. 6 (b).

The three-dimensional model is respectively rotated by a random angle along X, Y and Z coordinate, and a retrieval experiment is performed.

Figure 7:
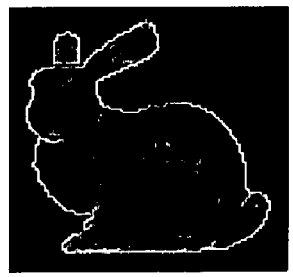
FIG. 7 is a schematic view illustrating the bunny model added with noises in accordance with the embodiment of the present invention.
Figure 7:
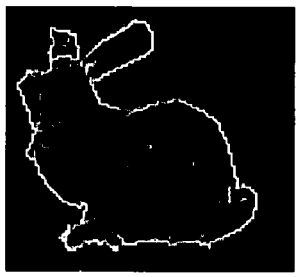

A random noise transformation of −6% to 6% is added to the three-dimensional model in the directions of X, Y and Z coordinates. The retrieval experiment is performed. FIG. 7 shows the result of the bunny model adding the noises.

The recall and the precision are defined as follows:

$$\text{Recall} = \frac{\text{correctly retrieved relevant models}}{\text{all relevant three-dimensional models}}$$

$$\text{Precision} = \frac{\text{correctly retrieved relevant models}}{\text{retrieval returned models}}$$

The recall represents the proportion of returned correctly retrieved models in the whole relevant models. The index measures the ability of the retrieval system to return the correct result. The precision represents the proportion of correctly retrieved three-dimensional models in all retrieval returned results. The index measures the precision of the retrieval returned result.

Figure 8:
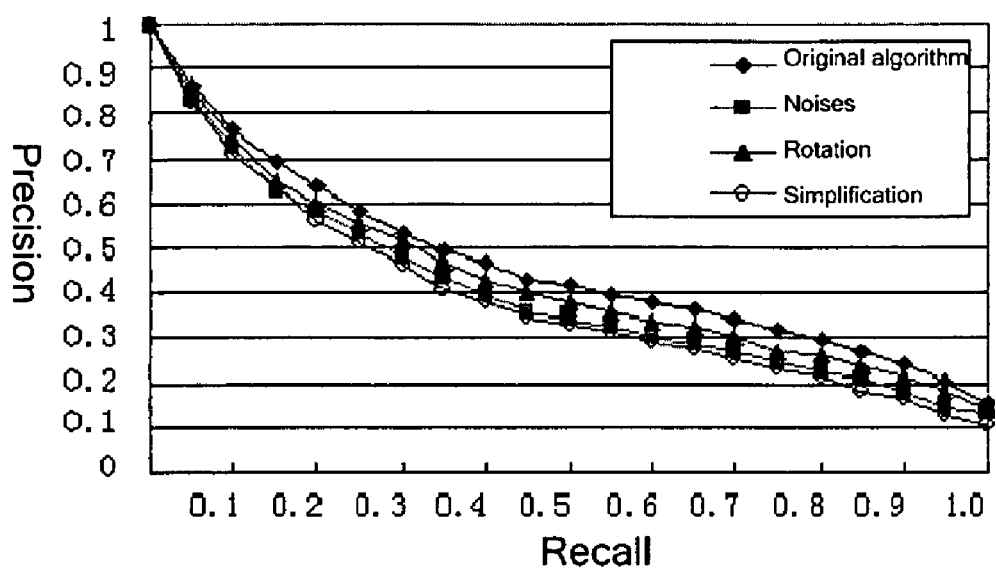
FIG. 8 is a schematic view illustrating experimental results on robustness in accordance with the embodiment of the present invention.

FIG. 8 shows the experimental results. As shown in FIG. 8, the algorithm employed in the present invention achieves good robustness on the noises, the rotation transformation and the grid simplification for the three-dimensional model.

Figure 9:
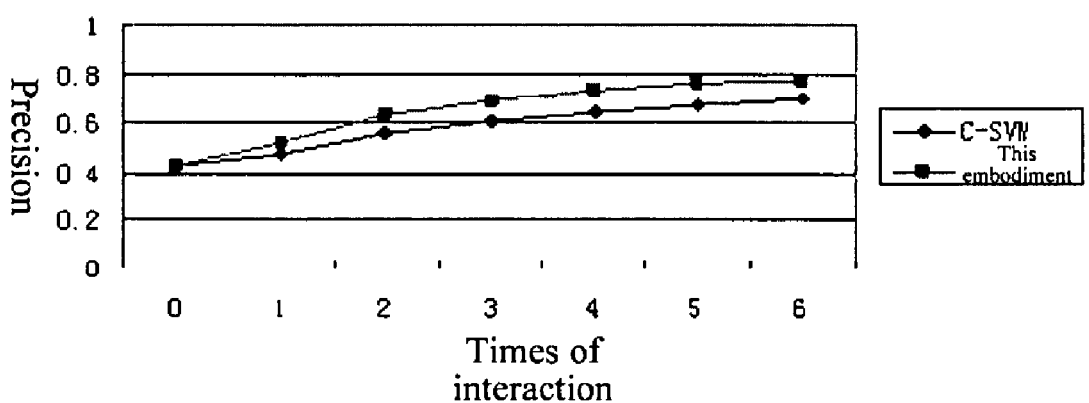
FIG. 9 is a schematic view illustrating a retrieval precision comparison between the embodiment of the present invention and the prior art.
Figure 10:
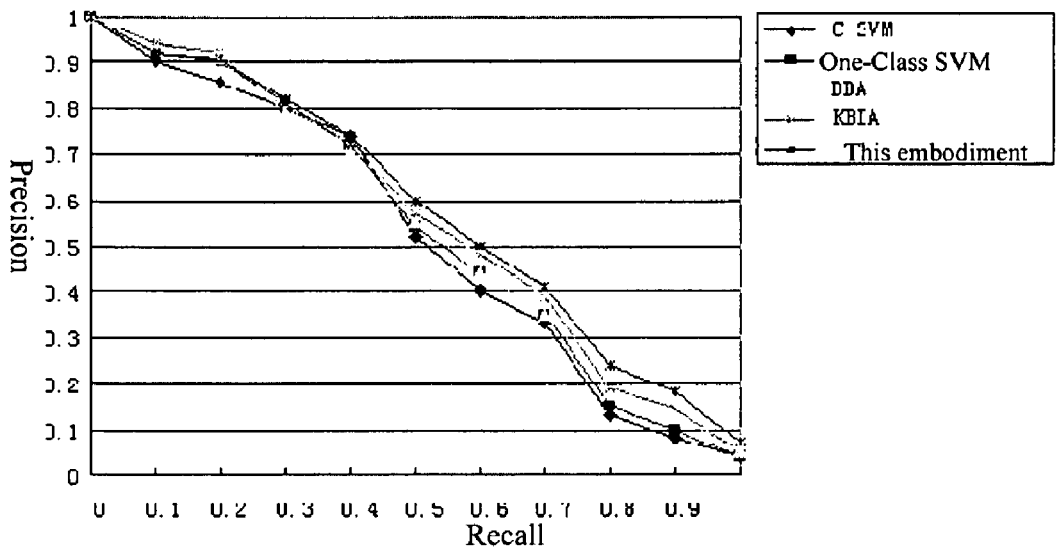
FIG. 10 is a schematic view illustrating a recall-precision comparison curve after a first round of feedback in accordance with the embodiment of the present invention.
Figure 11:
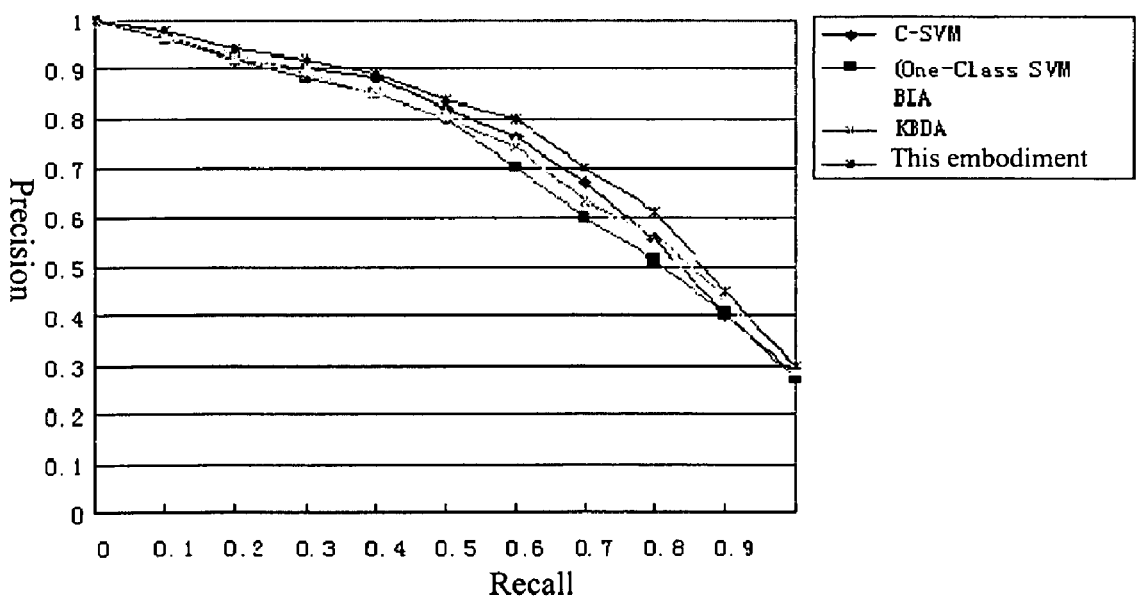
FIG. 11 is a schematic view illustrating the recall-precision comparison curve after the fifth round of feedback in accordance with the embodiment of the present invention.

The embodiment of the present invention trains the SVM with the multimedia model labeled by the user upon the retrieval result as a training sample set, performs the probability-based classification on the multimedia model by the SVM and updates the retrieval result with the classification result. A comparative test on relevance feedback is performed on the embodiment of the present invention. The experiment adopts the database containing 2,533 three-dimensional models. An experiment on feedback convergence speed is performed to check retrieval situations of the first 200 returned results. A fish model is selected to retrieve, manually label Non-fish models in the first 58 models to be displayed to the user for training and forecasting and the process is repeated. The precision in FIG. 9 is the proportion of the correctly retrieved relevant models in all returned models, i.e., N/200. In FIG. 9, C-SVM adopts a conventional SVM to perform training process and forecasting process on the data and each vector may only be attributed to one class in the training and forecasting processes, i.e., 1/−1. Once the forecast result is −1, this feedback considers that the model is irrelevant and will not be displayed to the user. Thereby, the feedback of the multimedia information retrieval in the embodiment of the present invention may well improve the precision and speed. The precision after each round of feedback is higher than the C-SVM method by 10% to 15%. In practice, the preferred results are achieved only after 2 to 3 rounds of feedback. Further, a recall-precision comparative experiment is performed on several relevant feedback techniques. FIG. 10 shows the recall-precision comparison curves after the first round of feedback by different methods. FIG. 11 shows the recall-precision comparison curves after the fifth round of feedback by different methods. The experimental results indicates that the precision achieved by the method of the present invention at the recall 0.5 is typically higher than the other methods by 6% to 14% in the first round of feedback; the precision achieved by the method of the present invention at the recall 0.5 is typically higher than the other methods by 3% to 5% in the fifth round of feedback. That is, the present invention has the higher precision no matter in the first round of feedback or after several rounds of feedback. Based on the above two experiments, the system provided in the embodiment of the present invention is apparently superior in the convergence speed and retrieval precision and is applicable for the relevant feedback of the multimedia information retrieval.

An application of the system is illustrated with reference to the three-dimensional animation designing scence. During the three-dimensional animation designing process, an available model meeting the requirements is employed or the available model basically meeting the requirements after slight modifications is employed. Therefore, a designer needs one three-dimensional model retrieval system to assist the selection of the models. The user may design or select one model substantially meeting the requirements as the input of the system and select the database file as another input of the system. Thus, the system performs each step in the flow chart and returns the model in the database most similar to the input model to the user. The user may manually label the returned result upon demands and perform one or several rounds of feedback. The embodiment of the present invention achieves the higher precision, suitable application range and desired speed (one round of typical retrieval or feedback may be finished within 5 seconds). Moreover, compared with conventional methods of selecting the model by sequentially viewing thousands of models in the database or searching the model by simply matching the file names, the embodiment of the present invention greatly enhances the precision and efficiency of selecting model and may be applied in the fields such as the biomolecule, the machine manufacturing, the terrain contour matching and the game and animation designing.

Figure 12:
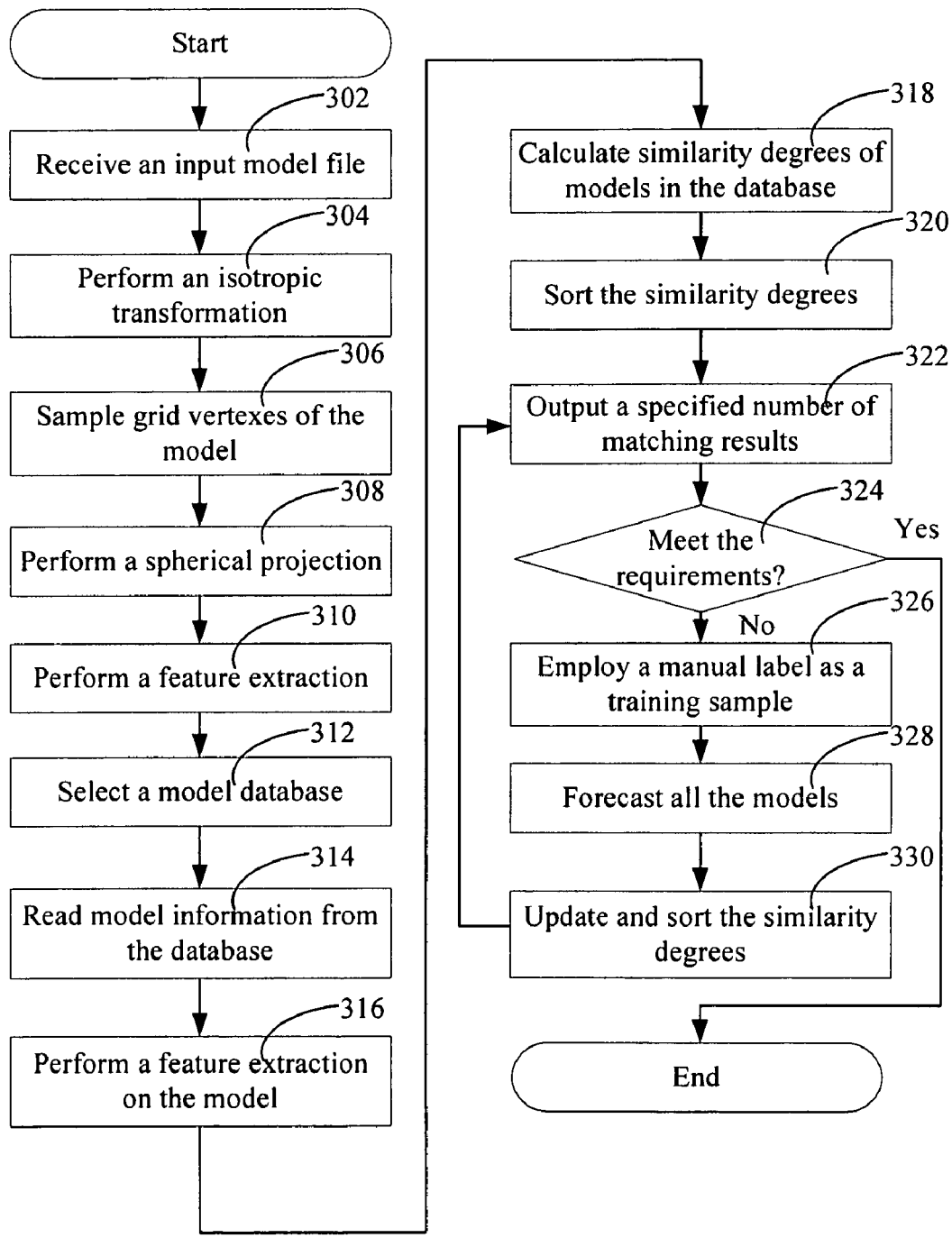
FIG. 12 is a flow chart illustrating the method for multimedia model retrieval in accordance with the embodiment of the present invention.

FIG. 12 shows the method for multimedia model retrieval in one embodiment. The method includes the following steps:

Block 302: An input model file is received and the parameters of the multimedia model to be retrieved are acquired. In this embodiment, the three-dimensional model file selected by the user as the matching source is received. Actually, the three-dimensional model files in various formats, such as .3ds files, may be received. The user selects one three-dimensional model file as the input and outputs the opened model file. The model file information including the model parameters is read. The model file information includes the number of the vertexes, the coordinates of the vertexes, the normal vectors and the vertex indexes of the triangles. The file format of the model file information may be the file format of storable texts, such as .txt. The details of reading the model file information may be implemented by the following steps in this embodiment:

1) The model file is opened.
2) The first 9 bits of the file are read as the start code of the vertexes and the procedure is skipped. The four bytes are read and stored as the integer variable to serve as the number of the vertexes. The Blocks 3) and 4) are repeated according to the number of the vertexes.
3) The coordinates x, y, z of the vertexes are read.
4) The coordinates x, y, z of the normal vectors are read.
5) The 11 bits are continued to be read as the start code of the triangles and the procedure is skip. The four bytes are read and store as the integer variable to serve as the number of the triangles. The Blocks 6) and 7) are repeated according to the number of the triangles.
6) The index values of the three vertexes of the current triangle are read. The coordinate values of the three vertexes are determined according to the index values.
7) The area of each triangle and the total area (m_myTotalArea) are calculated and saved according to the coordinate values of the three vertexes. Meanwhile, the minimum distance (m_fMinR) from the vertexes to the origin is calculated and saved. In the above reading process, if the model is the two-dimensional model, only the coordinates x and y of the model are read and no more description will be provided for the multidimensional model.

Block 304: The isotropic transformation is performed on the acquired multimedia model. Referring to FIG. 3, in this embodiment, the three-dimensional Zernike moment of the spherical image is associated with θ and α of the spherical coordinate system, the three-dimensional coordinate systems provided by the user may be inconsistent and the vertex distribution of the three-dimensional model may be non-uniform or the vertex density is too low. Therefore, in this embodiment, after the isotropic transformation is performed on the three-dimensional model by using the isotropic transformation unit 108, the vertex sampling is performed and the coordinates of the three-dimensional model are unified. Model structure variables after being performed the isotropic transformation are output. Area weighting coefficients are added to an isotropic transformation matrix and the formula is as follows:

$$\begin{cases} C_p = \left[\sum_{i,j=1}^{N} (s_i p_i - s_j q_j)(s_i p_i - s_j q_j)^t\right]^{-\frac{1}{2}} \\ Q = C_p P \end{cases} \quad (1)$$

wherein, $P=\{p_1, \ldots p_n\}$ is the vertex sequence before the transformation, $Q=\{q_1, \ldots q_n\}$ is the vertex sequence after the transformation and $s_i$ is the total area of all triangles adjacent to the vertex $p_i$. The improved transformation matrix $C_p$ still has the isotropic property, the area weighting is added in the vertex calculation to reduce the deviation caused by non-uniform vertex distribution. The isotropic transformation matrix is called as the area weighting isotropic transformation matrix. The matrix is adapted to perform the transformation on every vertex of the model structure variables and the feature values of the matrix are calculated and stored for later operation.

Block 306: The vertex sampling is performed according to the multimedia model after the isotropic transformation. In this embodiment, the triangles with the large area are subdivided, i.e., sampled. Referring to FIG. 4, the triangle (P1, P2, P3) is taken as the example in this embodiment. P1, P2, and P3 are respectively three vertexes of the triangle. The triangle (P1, P2, P3) is subdivided in the following manner: the longest side (P2, P3) is determined and P4 is the midpoint of the side (P2, P3); P1 and P4 are connected to subdivide the triangle (P1, P2, P3) into two triangles, i.e., the triangle (P1, P2, P4) and the triangle (P1, P4, P3); the areas of the triangles are calculated by Heron's formula. The area calculation of the triangles is the prior art and will not be repeated herein again. If the area of the triangle (P1, P2, P4) or the triangle (P1, P4, P3) is larger than the preset threshold F, the triangle with the area larger than the threshold F needs to be further subdivided by the aforementioned method. The rest may be deduced by analogy till the area of each triangle after subdivision is smaller than the threshold F. The incenter of each triangle after subdivision serves as the new sampling point of the three-dimensional model. Referring to FIG. 4, A1, A2, A3, and A4 are respectively new sampling points of the divided three-dimensional model. The aforementioned threshold F is preset as m_myTotalArea/100000 in this embodiment. For the two-dimensional model, the subdivision of the triangle may be implemented by merely dividing the curved edge of the two-dimensional model by the line segments. The principle is identical to that of the three-dimensional model. In addition, the multidimensional model may also adopt the same subdivision principle and the details will not be repeated herein again.

Block 308: The spherical projection is performed on the multimedia model according to the parameters of the multimedia model to obtain the spherical projection image. In this embodiment, the above three-dimensional model may be normalized to fit inside the unit sphere, also called as the unit bounding sphere. The sphere center is marked as $P_c$. Suppose the $P(r_1, r_2)$ is the collection of the vertexes of the three-dimensional model, $P(r_1, r_2)$ may be expressed as:

$$P(r_1, r_2) = \{P | r_1 < L(P, P_c) \leq r_2, r_1 < r_2\} \quad (2)$$

$r_1$ and $r_2$ respectively represent the shortest distance and the longest distance from the sphere center $P_c$, and $L(P, P_c)$ represents the distance from the model vertex P to the sphere center $P_c$. The radius is marked as $r_2$, and the spherical surface is marked as $S_{r_2}$. The spherical surface is uniformly partitioned by longitude and latitude lines and initial longitude latitude weight values of all grids are 0. Each vertex in the vertex collection $P(r_1, r_2)$ of the three-dimensional model is mapped to $S_{r_2}$. Referring to FIG. 5, the vertex $P_i$ is mapped to the spherical surface in the following manner. $P_c$ and $P_i$ are connected, and $P_c P_i$ is elongated to intersect with $S_{r_2}$. Suppose the intersection point is in the grid $(P_1, P_2, P_3, P_4)$ of $S_{r_2}$, the longitude latitude weight values of the grid $(P_1, P_2, P_3, P_4)$ are added by 1. After all the vertexes in $P(r_1, r_2)$ are mapped to $S_{r_2}$, the spherical projection of $P(r_1, r_2)$ is obtained and marked as $PRO(r_1, r_2)$. In this embodiment, r1=m_fMinR−0.1 and r2=1.0001, so as to prevent any vertex from intersecting with the two spherical surfaces. For the two-dimensional model, the above spherical projection may be similarly projected onto the unit circle and the principle is identical to that of the three-dimensional model. In addition, the multidimensional model may also adopt the same projection principle, and the details will not be repeated herein again.

Block 310: The feature extraction is performed on the projection image. In this embodiment, the feature extraction is implemented by the Zernike moment as the example for illustration. The spherical projection image is served as the input structure variable to output the three-dimensional Zernike moment coefficient structure variables. The feature extraction module 114 calculates the Zernike moment coefficient of the three-dimensional model, for example, the calculation formula based on the Cartesian coordinate system is as follows:

$$x=|x|\xi=r\xi=r(\sin\alpha\sin\theta, \sin\alpha\cos\theta, \cos\theta)^T \quad (3)$$

The three-dimensional Zernike moment is calculated by the following formula. In the formula, f(x) is the function for converting the obtained spherical projection function to the Cartesian coordinate system and n is the bandwidth and preferably 16 upon tests; m is the frequency component under each band; $0 \leq l \leq n$, and then n–l is made the odd number.

$$\Omega_{nl}^m = \frac{3}{4\pi}\int_{|x|\leq 1} f(x)\overline{Z_{nl}^m(x)}dx \quad (4)$$

$$Z_{nl}^m(x) = R_{nl}(r) \cdot Y_l^m(\alpha, \theta) \quad (5)$$

In the formula (5), $R_{nl}(r)$ is the polynomial taking the radius of the spherical coordinate system as the parameter and $Y_l^m$ is the spherical surface harmonic operator. In actual calculation, each value in $r \in (0,1]$ is taken to obtain $Z_{nl}^m$ through integration. The formula (6) is the computation expression of the spherical surface harmonic operator, wherein $N_l^m$ is the scale factor in the formula (7) and $P_l^m$ is the Legendre polynomial.

$$Y_l^m(\alpha, \theta) = N_l^m P_l^n(\cos\alpha)e^{im\theta} \quad (6)$$

$$N_l^m = \sqrt{\frac{2l+1}{4\pi}\frac{(l-m)!}{(l+m)!}} \quad (7)$$

The second-order norm of the three-dimensional Zernike moment is calculated and stored for later operation. The calculation formula is as follows:

$$F_{nl} = \|\Omega_{nl}\| = \left(\sum_{i=-l}^{l}(\Omega_{nl}^i)^2\right)^{1/2} \quad (8)$$

Block 312: The model database is selected.

Block 314: The multimedia model file information stored in the model database is read. In this embodiment, the model database file may be the pre-processed .txt file generated in the same way as the aforementioned pre-processing or by other pre-processing methods. In this embodiment, the processing may be: inputting the opened database file variables and outputting the structure link lists of every model information in the database. The data is read and saved in the link list to be called in subsequent processes. The three-dimensional model database file includes the number of the model files, the file names, the three-dimensional Zernike moment coefficient, the isotropic transformation matrix coefficients and so on. The details of the step are as follows:

1) The database file is opened.

2) The number of the model files stored in the database is read. The method is to read the first four bytes of each file and store the first four bytes of each file as the integer variable. The following steps are repeatedly implemented according to the number of the model files.

3) The link list nodes are initialized which we call the DataLink. The structure of the DataLink includes the following data: one Cstring variable for saving model file names, one float array with the size of 289 for saving the three-dimensional Zernike moment coefficient, one float array with the size of 9 for saving the isotropic transformation matrix coefficients, three float variables for saving three feature values of the isotropic transformation matrix and one DataLink* pointer for pointing to the subsequent nodes.

4) The length of the model file name is read. The method is to read the first 4 bytes of the file and save the first 4 bytes as the integer variable. Thereby, the file name is read according to the number of bytes indicated by the length.

5) The Zernike moment coefficient is read. The Zernike moment coefficient is one float array in the size of 289.

6) The 9 (3*3) isotropic transformation matrix coefficients are read and three feature values of the isotropic matrix are calculated.

Block 316: The feature extraction is performed on the multimedia model files in the database or the features stored in the files are directly read. In this embodiment, the 3ds files stored in the database are taken as the example to illustrate the feature extraction performed on the multimedia model files and the extraction implemented by the Zernike moment is taken as the example. The spherical projection image is served as the input structure variable to output the three-dimensional Zernike moment coefficient structure variables. The feature extraction module 114 calculates the Zernike moment coefficient of the three-dimensional model, for example, the calculation formula based on the Cartesian coordinate system is as follows:

$$x=|x|\xi=r\xi=r(\sin\alpha\sin\theta, \sin\alpha\cos\theta, \cos\theta)^T \quad (3)$$

The three-dimensional Zernike moment is calculated by the following formula. In the formula, f(x) is the function for converting the obtained spherical projection function to the Cartesian coordinate system and n is the bandwidth and preferably 16 upon tests; m is the frequency component under each band; and l is satisfied with $0 \leq l \leq n$ and to n–l the odd number.

$$\Omega_{nl}^m = \frac{3}{4\pi}\int_{|x|\leq 1} f(x)\overline{Z_{nl}^m(x)}dx \quad (4)$$

$$Z_{nl}^m(x) = R_{nl}(r) \cdot Y_l^m(\alpha, \theta) \quad (5)$$

In the formula (5), $R_{nl}(r)$ is the polynomial taking the radius of the spherical coordinate system as the parameter and $Y_l^m$ is the spherical surface harmonic operator. In actual calculation, each value in $r \in (0,1]$ is taken to obtain $Z_{nl}^m$ through integral. The formula (6) is the computation expression of the spherical surface harmonic operator, wherein $N_l^m$ is the scale factor in the formula (7) and $P_l^m$ is the Legendre polynomial.

$$Y_l^m(\alpha, \theta) = N_l^m P_l^n(\cos\alpha)e^{im\theta} \quad (6)$$

$$N_l^m = \sqrt{\frac{2l+1}{4\pi}\frac{(l-m)!}{(l+m)!}} \quad (7)$$

The second-order norm of the three-dimensional Zernike moment is calculated and stored for later operation. The calculation formula is as follows:

$$F_{nl} = \|\Omega_{nl}\| = \left(\sum_{i=-l}^{l} (\Omega_{nl}^i)^2\right)^{1/2} \quad (8)$$

Block 318: The feature extraction result is matched with the stored model multimedia file information to obtain the retrieval result. In this embodiment, the three-dimensional model matching includes calculating the offset distance of the three-dimensional Zernike moment coefficient, calculating the similarity degrees of the models, sorting the similarity degrees and outputting the result. The offset distance of the three-dimensional Zernike moment is calculated by the formula (9), wherein $\Omega_{nl1}^i$ is the three-dimensional Zernike moment coefficient of the model selected by the user and $\Omega_{nl2}^i$ is the three-dimensional Zernike moment of the certain model in the database.

$$\mathit{diff} = \sum_{i=-l}^{l} |\Omega_{nl1}^i - \Omega_{nl2}^i| \quad (9)$$

The similarity degrees of the models are calculated. The similarity degree of the models reflects how the two three-dimensional models are alike. The smaller the similarity degree is, the worse the similarity of the three-dimensional models is. On the contrary, the bigger the similarity degree is, the better the similarity of the three-dimensional models is. The isotropic transformation employed in the pre-processing should be considered. The calculation formulas are shown as formulas (10) and (11), wherein $ev_{1i}$ is the feature value of the isotropic transformation matrix of the model selected by the user and $ev_{2i}$ is the feature value of the isotropic transformation matrix of the certain model in the database.

$$\mathit{evdiff} = \sum_{i=1}^{3} |ev_{1i} - ev_{2i}| \quad (10)$$

$$sim = 1 - \mathit{diff} * \mathit{evdiff} \quad (11)$$

Block 320: The retrieval result obtained by matching or the updated retrieval result is sorted. In this embodiment, the obtained similarity degrees of the models are sorted in descending order. The sort algorithm is at least one selected from the bubble sort, the hash sort, the quick sort, the merge sort and the heap sort. The model file names are sequentially stored in the text file after being sorted.

Block 322: The sorted result is output. In this embodiment, several sorted results are selected and output sequentially. The specific method is: The corresponding files in the database are found according to the file names, and the information of the vertexes and the grids are read and depicted on the program interface. The number of the output models should satisfy the demand of the next feedback and is preferably 40 to 60. In the preferable embodiment, each page may also display 20 models with the first one fixedly displaying the model selected by the user and the rest 19 models displaying the results. Altogether 3 pages display 58 models in total.

Block 324: It is determined whether the result meets the user's requirement; if the result meets the user's requirement, the block is directly ended; if the result does not meet the user's requirement, the block proceeds to Block 326.

Blocks 326 and 328: The SVM is trained with the multimedia model labeled by the user upon the retrieval result as a training sample set, the probability-based classification is performed on the multimedia model via the SVM and the retrieval result is updated with the classification result. The user manual label is employed as the training sample and the SVM is obtained by training according to the training sample. The models in the database are forecasted by the SVM. In this embodiment, if the model in the result and the input model are relevant, the probability value is set to be 1; and if the model in the result and the input model are irrelevant, the probability value is set to be $-1$. The probability values of the models and the second-order norms of the three-dimensional Zernike moment are written into one text file. The saved data (referred to as the vectors) is used to train one SVM. One proper non-linear map $\phi: x \to \phi(x)$ is employed to map original data into one high-dimensional feature space, so that the linear classification method is applicable to the high-dimensional feature space. The calculation formula is as follows:

$$\min_{w,b,\xi} \frac{1}{2} w^T w + C \sum_{i=1}^{l} \xi_i \text{ satisfying } y_i(w^T \phi(x_i) + b) \geq 1 - \xi_i, \quad (11)$$

$$\xi_i \geq 0, i = 1 \ldots l$$

C is the penalty factor and $\phi(x_i)$ is the aforementioned non-linear map. The equivalent form of the formula (12) used in the actual calculation is shown as follows.

$$\min_{\alpha} \frac{1}{2} \alpha^T Q \alpha - e^T \alpha \text{ satisfying } y^T \alpha = 0, 0 \leq \alpha_i \leq C, i = 1 \ldots l \quad (13)$$

The vector e represents each training data; $Q_{ij} \equiv y_i y_j K(x_i, x_j)$ is the positive semi-definite matrix; and $K(x_i, x_j) \equiv \phi(x_i)^T \phi(x_j)$ is the kernel function and may be one of the following functions:

Linear function: $K(x_i, x_j) = x_i^T x_j$ (14)

Polynomial function: $K(x_i, x_j) = (\gamma x_i^T x_j + r)^d, \gamma > 0$ (15)

Radial basic function (RBF): $K(x_i, x_j) = \exp(-\gamma \|x_i - x_j\|^2)$, $\gamma > 0$ (16)

Sigmoid function: $K(x_i, x_j) = \tan h(\gamma x_i^T x_j + r)$ (17)

In one embodiment, RBF is selected and $\gamma = 10^{-3}$.

Generally, when the SVM trains the support vector, the classification determining function of each data is set as follows:

$$f(x) = \sum_{i=1}^{l} y_i \alpha_i K(x_i, x) + b \quad (18)$$

$\alpha$ is calculated in the following steps:

1) The kernel function (16) is substituted in the formula (13) combined with a constraint condition to construct the Lagrange function to obtain the group of $\alpha$ vectors when a target formula is established.

2) The $\alpha$ vectors are substituted in the formula (19) or (20) to obtain the value of b.

3) The $\alpha$ vectors and the value b are substituted in the formula (18) to obtain the expression of the determining function.

4) The formula (18) is substituted in the formula (22) to obtain the expression of the probability value of the support vector. To calculate the values of A and B in the expression, the formulas (24) and (25) are substituted in the formula (23). The minimum value of the formula (23) is obtained by the iterative method and the values of A and B at this time are desired. The values are substituted back to the formula (24) (i.e., 21) to obtain the probability value of each support vector.

5) The probability values of the support vectors are employed to calculate the probability values of sample points, i.e., the values of A, B and the formula (18) are substituted in the formula (26) for calculation.

6) The above values are calculated to obtain the formulas (28) and (29).

b is calculated by the following method: If there is $0 < \alpha_i < C$ $$b = -\frac{\sum_{0 < \alpha_i < C} y_i \nabla f(\alpha)_i}{\sum_{0 < \alpha_i < C} 1} \tag{19}$$

if there is not $0 < \alpha_i < C$, $$M(\alpha) = \max\{y_i \nabla f(\alpha)_i \mid \alpha_i = 0, y_i = -1 \text{ or } \alpha_i = C, y_i = 1\} \tag{20}$$

$$m(\alpha) = \min\{y_i \nabla f(\alpha)_i \mid \alpha_i = 0, y_i = 1 \text{ or } \alpha_i = C, y_i = -1\}$$

$$b = \frac{M(\alpha) + m(\alpha)}{2}$$

Generally, the sign function is employed for classification, i.e., the classification is performed according as the value of the formula (21) is 1/−1:

$$\text{sgn}(\theta(x)) \tag{21}$$

In this embodiment, the posterior probability $p(y=1|x)$ of classifying some data to 1 is calculated, i.e., the probability which one model is considered belonging to the similar class. The calculation formula is shown as follows, wherein $f(x)$ is the aforementioned determining function.

$$p(x) = \frac{1}{1 + \exp(Af(x) + B)} \tag{22}$$

To estimate the optimum parameter value of (A, B), the present invention employs l training samples to calculate the following formula (in one embodiment, l=58):

$$\min_{z=(A,B)} F(z) \text{ where } F(z) = -\sum_{i=1}^{l} (t_i \log(p_i) + (1 - t_i)\log(1 - p_i)), \tag{23}$$

$$p_i = \frac{1}{1 + \exp(Af_i + B)}, \tag{24}$$

$$t_i = \begin{cases} \frac{N_+ + 1}{N_+ + 2} & \text{if } y_i = 1 \\ \frac{1}{N_- + 2} & \text{if } y_i = -1 \end{cases} \quad i = 1 \ldots l \tag{25}$$

$N_+$ is the number of samples with $y_i=1$ and $N_-$ is the number of samples with $y_i=-1$.

The optimum value of (A, B) obtained is substituted in the formula (24) to calculate the probability value of each support vector and save the probability value for later operation.

The support vectors obtained by the above training are used to forecast the posterior probability of each model in the database. The formula (18) is employed to calculate the determining function of each data. The probabilities considered relevant are obtained as:

$$pp_i = \min\{\max\{sp(f_i, A, B), \sigma\}, 1 - \sigma\} \tag{26}$$

wherein, $$sp(f_i, A, B) = \begin{cases} \frac{\exp(-fApB)}{1 + \exp(-fApB)} & fApB \geq 0 \\ \frac{1}{1 + \exp(fApB)} & fApB < 0 \end{cases} \tag{27}$$

$$fApB = A * f_i + B$$

$\sigma$ is the preset minimum probability value and $\sigma=10^{-7}$ is indicated in one embodiment.

The forecast probability of each model in the database is obtained and saved for later operation.

The similarity degrees are updated and sorted. The updating formula is as follows:

$$pp\text{sum}_{new} = \epsilon * pp\text{sum}_{old} + pp, \ 0 \leq \epsilon \leq 1 \tag{28}$$

$$\text{sim}_{new} = \text{sim}_{old} + pp\text{sum}_{new} \tag{29}$$

The coefficient $\epsilon$ controls the proportion of the probability values forecasted in the previous several rounds in the total corrected value. If the coefficient $\epsilon$ is 0, it represents that only the current forecast value has effects on the corrected value, and if the coefficient $\epsilon$ is 1, all the previous forecast values share the same importance in the corrected value. This coefficient is set as 0.5 in one embodiment.

The current result is displayed to the user. If necessary, multiple rounds of feedback are performed. In the embodiment of the present invention, the latest round of the manual label of the user is employed to train the SVM in each round of feedback, the probability is used in the training and forecasting processes and each correction to the similarity degree value is remained. The practice proves that the model retrieval system is effective in the multimedia information retrieval and feedback field. The model retrieval system is applicable to the two-dimensional model or the multidimensional model and the details will not be illustrated herein again.

Block 330: the similarity degrees are updated and sorted again. After Block 330 is finished, the process proceeds back to Block 322.

The aforementioned model retrieval method trains the SVM with the multimedia model labeled by the user upon the retrieval result as a training sample set, performs the probability-based classification on the multimedia model via the SVM and updates the retrieval result with the classification result. In this manner, when retrieving the multimedia model, the retrieval result with higher retrieval precision is obtained with fewer model samples, the feedback frequency is reduced and favorable applicability and robustness are achieved. Therefore, the system for multimedia model retrieval may serve as the three-dimensional model retrieval system in fields such as the biomolecule, the machine manufacturing, the terrain contour matching and the game and animation designing, so that the users may perform the rapid and precise retrieval on the massive model data in these fields. The spherical projection image and the three-dimensional Zernike moment are employed to measure the features of the three-dimensional model. The robustness tests of the noises, the rotation and the grid simplification are performed on this embodiment. The test processes are respectively illustrated as follows:

The grid simplification is performed on the three-dimensional model and the number of the vertexes of the simplified three-dimensional model is 20% to 50% of the original number. FIG. 6 shows the simplification result of the bunny model. There are 554 vertexes in FIG. 6 (a) and 255 vertexes in FIG. 6 (b). According to FIG. 6 (b), due to the reduction of the vertexes, the simplified model loses many specific details, i.e., loses a part of the features that may affect the retrieval result. The retrieval experiment analyse is performed to see the impact of the simplified model on the retrieval method.

The three-dimensional model is respectively rotated by the random angle along X, Y and Z coordinate axes, and the retrieval experiment is performed to see the impact of the model rotation on the retrieval method.

The random noise transformation of −6% to 6% is added to the three-dimensional model in the directions of X, Y and Z coordinates. FIG. 7 shows the result of adding noises to the bunny model. By comparing FIGS. 7 (c) and 7 (d), it may be seen that the model added with noises has vertexes that do not belong to the model, thus resulting in burrs on the profile of the model, i.e., adding redundant features that may affect the retrieval result. The retrieval experiment is performed to see the impact of the noises on the retrieval method.

The recall and the precision are defined as follows:

$$Recall = \frac{correctly\ retrieved\ relevant\ models}{all\ relevant\ three\text{-}dimensional\ models}$$

$$Precision = \frac{correctly\ retrieved\ relevant\ models}{retrieval\ returned\ models}$$

The recall represents the proportion of the returned correctly retrieved models in the whole relevant models. The index measures the ability of the retrieval system to return the correct result. The precision represents the proportion of the correctly retrieved three-dimensional models in all retrieval returned results. The index measures the precision of the retrieval result.

FIG. 8 shows the experimental results. A diamond line represents the performance of the recall and precision of the model sample without any interference processing. A block line represents the performance of the recall and precision of the model sample with the interference of the noises. A triangle line represents the performance of the recall and precision of the model sample after the rotation process. A circle line represents the performance of the recall and precision of the model sample after the grid simplification. According to the curves in FIG. 8, the retrieval method in the present invention achieves the better robustness on the three-dimensional model noises, the three-dimensional model rotation transformation and the three-dimensional model grid simplification.

The embodiment of the present invention trains the SVM with the multimedia model labeled by the user upon the retrieval result as a training sample set, performs the probability-based classification on the multimedia model by the SVM and updates the retrieval result with the classification result. The comparative test on the relevance feedback is performed on the embodiment of the present invention. The experiment adopts the database containing 2,533 three-dimensional models. The experiment on the feedback convergence speed is performed to check the retrieval situations of the first 200 returned results. A fish model is selected to retrieve, manually label Non-fish models in the first 58 models to be displayed to the user for training and forecasting and the process is repeated. The precision in FIG. 9 is the proportion of the correctly retrieved relevant models in all returned models, i.e., N/200. In FIG. 9, C-SVM adopts the conventional SVM to perform the training process and the forecasting process on the data and each vector may only be attributed to one class in the training and forecasting processes, i.e., 1/−1. Once the forecast result is −1, this feedback considers that the model is irrelevant and will not be displayed to the user. Thereby, the feedback of the multimedia information retrieval in the embodiment of the present invention may well improve the precision and speed. The precision after each round of feedback is higher than the C-SVM method by 10% to 15%. In practice, the preferred results are achieved only after 2 to 3 rounds of feedback. Further, the recall-precision comparative experiment is performed on several relevant feedback techniques. FIG. 10 shows the recall-precision comparison curves after the first round of feedback by different methods. FIG. 11 shows the recall-precision comparison curves after the fifth round of feedback by different methods. The experimental results indicates that the precision achieved by the method of the present invention at the recall 0.5 is typically higher than the other methods by 6% to 14% in the first round of feedback; the precision achieved by the method of the present invention at the recall 0.5 is typically higher than the other methods by 3% to 5% the fifth round of feedback. That is, the present invention has the higher precision no matter in the first round of feedback or after several rounds of feedback. Based on the above two experiments, the system provided in the embodiment of the present invention is apparently superior in the convergence speed and retrieval precision and is applicable for the relevant feedback of the multimedia information retrieval.

The application of the system is illustrated with reference to the three-dimensional animation designing scence. During the three-dimensional animation designing process, the available model meeting the requirements is employed or the available model basically meeting the requirements after slight modifications is employed. Therefore, the designer needs one three-dimensional model retrieval system to assist the selection of the models. The user may design or select one model substantially meeting the requirements as the input of the system, and select the database file as another input of the system. Thus, the system performs each step in the flow chart and returns the model in the database most similar to the input model to the user. The user may manually label the returned result upon demands and perform one or several rounds of feedback. The embodiment of the present invention achieves the high precision, the suitable application range and the desired speed (the round of the typical retrieval or the feedback may be finished within 5 seconds). Moreover, compared with the conventional methods of selecting the model by sequentially viewing thousands of models in the database or searching the model by simply matching the file names, the embodiment of the present invention greatly enhances the precision and efficiency of selecting model and may be applied in the fields such as the biomolecule, the machine manufacturing, the terrain contour matching and the game and animation designing.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A method for multimedia model retrieval, comprising:
acquiring parameters of a first multimedia model to be retrieved;
performing a projection on the first multimedia model according to the parameters of the first multimedia model so as to obtain a projection image;
performing a feature extraction on the projection image to generate a first feature extraction result;
comparing the first feature extraction result with a plurality of feature extraction results corresponding to a plurality of multimedia models stored in a database so as to obtain a retrieval result, wherein the retrieval result comprises a number of multimedia models;
labeling by a user each of the multimedia models in the retrieval result with a probability value;
training a support vector machine with the labeled multimedia models;
performing a probability-based classification on the plurality of multimedia models stored in the database by using the support vector machine to obtain a classification result; and
updating the retrieval result with the classification result.

2. The method according to claim 1, wherein the performing the feature extraction on the projection image comprises: performing the feature extraction on the first multimedia model by using a Zernike moment.

3. The method according to claim 1, further comprising: performing a pre-processing on the parameters of the first multimedia model to be retrieved.

4. The method according to claim 2, further comprising: performing a pre-processing on the parameters of the first multimedia model to be retrieved.

5. The method according to claim 3, wherein the pre-processing comprises:
performing an isotropic transformation on the first multimedia model; and
performing a vertex sampling according to the first multimedia model after the isotropic transformation.

6. The method according to claim 1, wherein the performing a probability-based classification on the plurality of multimedia models stored in a database by using the support vector machine to obtain a classification result comprises:
forecasting each of the multimedia models in the database, obtaining relevant or irrelevant probability values attributed to each of the multimedia models in the database and revising a similarity degree by the probability values.

7. The method according to claim 1, wherein the performing the projection on the first multimedia model according to the parameters of the first multimedia model comprises: performing a spherical projection on a three-dimensional multimedia model and calculating a spherical projection image.

8. The method according to claim 1, further comprising: sorting the retrieval result obtained by comparing or the retrieval result obtained after updating.

9. The method according to claim 1, wherein a file format of the parameters of the first multimedia model to be retrieved is a three-dimensional model file format .3ds or a text file format .txt.

10. The method according to claim 1, wherein the probability-based classification comprises a similarity classification which is based on posterior probability.

11. An apparatus for multimedia model retrieval, comprising: at least one hardware processor operable to:
acquire parameters of a first multimedia model to be retrieved;
generate a projection image from the first multimedia model according to the parameters of the first multimedia model;
perform a feature extraction on the projection image to generate a first feature extraction result;
compare the first feature extraction result with a plurality of feature extraction results corresponding to a plurality of multimedia models stored in a database so as to obtain a retrieval result, wherein the retrieval result comprises a number of multimedia models; and
train a support vector machine with multimedia models labeled by a user upon the retrieval result with a probability value, and perform a probability-based classification on the plurality of multimedia models stored in a database by the support vector machine to obtain a classification result, and update the retrieval result with the classification result.

12. The apparatus according to claim 11, wherein the at least one hardware processor is further operable to perform a pre-processing on the parameters of the first multimedia model to be retrieved.

13. The apparatus according to claim 12,
wherein the at least one hardware processor is further operable to perform an isotropic transformation on the first multimedia model; and
to perform a vertex sampling on the first multimedia model after the isotropic transformation.

14. The apparatus according to claim 11,
wherein the at least one hardware processor is further operable to employ the multimedia models manually labeled by a user upon the retrieval result with a probability value as a training sample and train according to the training sample to obtain the support vector machine; and
to perform a probability-based classification on the plurality of multimedia models stored in a database by the support vector machine to obtain a classification result, and update the retrieval result with the classification result.

15. The apparatus according to claim 11, wherein the at least one hardware processor is further operable to sort the retrieval result obtained by comparing or the retrieval result obtained after updating.

16. A system for multimedia model retrieval, comprising:
a database management system adapted to store multimedia model file information;
a model retrieval apparatus adapted to acquire parameters of a first multimedia model to be retrieved, perform a projection on the first multimedia model according to the parameters of the first multimedia model so as to obtain a projection image, perform a feature extraction on the projection image to generate a first feature extraction result, comparing the first feature extraction result with a plurality of feature extraction results corresponding to a plurality of multimedia models stored in the database management system to obtain a retrieval result, wherein the retrieval result comprises a number of multimedia models, train a support vector machine with the multimedia models labeled by a user upon the retrieval result with a probability value, perform a probability-based classification on the plurality of multimedia models stored in a database by using the support vector machine to obtain a classification result and update the retrieval result with the classification result.

* * * * *

UNITED STATES PATENT AND TRADEMARK OFFICE
CERTIFICATE OF CORRECTION

PATENT NO. : 8,082,263 B2
APPLICATION NO. : 12/205792
DATED : December 20, 2011
INVENTOR(S) : Yanping Ma and Qinwei Zhang It is certified that error appears in the above-identified patent and that said Letters Patent is hereby corrected as shown below:

In the Specification

Column 4, line 60, please delete Equation (1) in it's entirety and substitute the following:

$$\begin{cases} \underline{C}_P = [\sum_{i,j=1}^{N}(s_i p_i - s_j q_j)(s_i p_i - s_j q_j)^t]^{-\frac{1}{2}} \\ Q = C_P P \end{cases}$$

Column 19, line 38, please delete Equation (21) in it's entirety and substitute the following:

$\operatorname{sgn}(f(x))$

Signed and Sealed this
Twenty-fifth Day of June, 2013

Teresa Stanek Rea
*Acting Director of the United States Patent and Trademark Office*